United States Patent

[11] 3,621,460

[72] Inventor Colin S. Willett
 Washington, D.C.
[21] Appl. No. 52,497
[22] Filed July 6, 1970
[45] Patented Nov. 16, 1971
[73] Assignee The United States of America as
 represented by the Secretary of the Army

[54] SPUTTERED VAPOR LASER
 9 Claims, 1 Drawing Fig.

[52] U.S. Cl. .................................................. 331/94.5
[51] Int. Cl. .................................................. H01s 3/00
[50] Field of Search ...................................... 331/94.5

[56] References Cited
 UNITED STATES PATENTS
 3,464,025 8/1969 Bell ............................ 331/94.5

Primary Examiner—Ronald L. Wibert
Assistant Examiner—Conrad Clark
Attorneys—Harry M. Saragovitz, Edward J. Kelly, Herbert Berl and J. D. Edgerton ABSTRACT: A sputtered vapor laser which features two discharges within a single lasing apparatus. A secondary discharge is caused to occur between an anode and a hollow cathode whose surface is coated with a suitable lasing material. The sputtering action of the secondary discharge on the surface of the hollow cathode produces vapor of the lasing material inside the hollow cathode. The electric field set up by the cathode of the primary laser discharge acts to draw the vapor of the lasing material towards the primary cathode along the main plasma section of the laser to provide the required concentration of atoms in which to sustain laser oscillation. The atoms of the sputtered vapor are excited in the main plasma section by inelastic collisions with excited carrier gas atoms or ions or with electrons energized by the electric field existing in the discharge between the hollow cathode and the primary cathode. The hollow cathode is biased more positively than the primary cathode so that it acts as the anode of the primary laser discharge. Electrical feedback can be utilized between the primary and the secondary discharge circuitry to control the current of the secondary discharge.

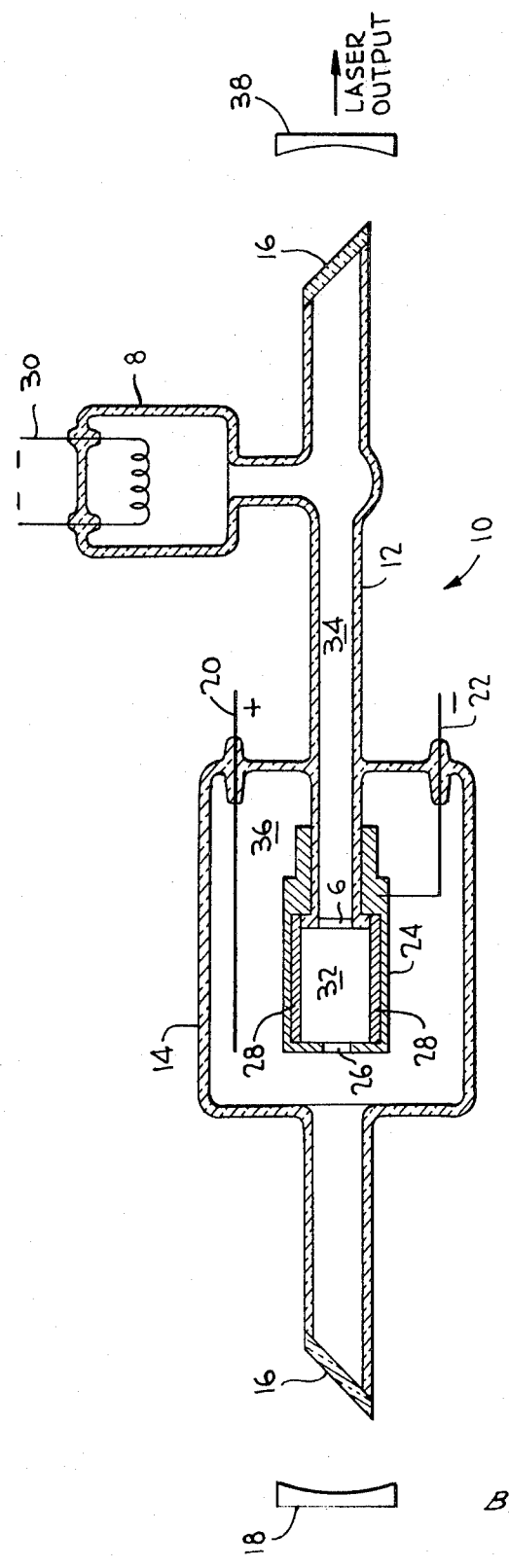

SPUTTERED VAPOR LASER

RIGHTS OF GOVERNMENT

The invention described herein may be manufactured, used, and licensed by or for the United States Government for governmental purposes without the payment to me of any royalty thereon.

BACKGROUND OF THE INVENTION

1. Field of the Invention

This invention relates to lasers, and more particularly, to a gas laser in which the sputtering action of a secondary hollow cathode discharge is utilized to provide the vapor-lasing medium.

2. Description of the Prior Art

Various deficiencies continue to exist in gas lasers when it comes to providing a sufficient and accurately controllable density of the gas vapor lasing material required for a lasing medium. One practice thus far has been to use an externally heated reservoir of metal maintained at a high temperature to provide the metal vapor atoms which are allowed to diffuse out into the main plasma section of the laser. See, for example, The Commercial Helium-Cadmium Laser, J. D. Tompkins, Laser Focus, Aug. 1969, pp. 32-35. Such devices are very slow to operate because of the time required to raise the reservoir of metal up to the necessary temperature. W. E. Bell discloses in U.S. Pat. No. 3,464,025 a hollow cathode discharge laser whose lasing ions are generated by sputtering of the cathode surface. However, in his device the laser population inversion mechanisms would be adversely affected by the high concentration of electrons existing within the hollow cathode. This would necessitate very selective lasing conditions which would be extremely difficult to control and maintain.

It is therefore a primary object of the present invention to provide a sputtered vapor laser that utilizes a hollow cathode discharge in which no warmup time is necessary and in which the lasing conditions are not adversely affected by the sputtering of the vapor.

Another object is to provide a sputtered vapor laser in which two discharges are utilized, the first of which creates the sputtering action and the second of which is the primary laser discharge.

An additional object is to provide a sputtered vapor laser in which the primary laser discharge acts to draw out the sputtered vapor from within the hollow cathode to provide the necessary concentration of atoms in which to sustain laser oscillation in the main plasma section of the laser.

A further object of the present invention is to provide a sputtered vapor laser which utilizes a hollow cathode discharge that enables different metals of high melting points (low vapor density) and other elements or nonmetallic compounds to be used as laser media by using them to form the cathode itself or as liner materials inside a suitable electrically conducting cathode.

An additional object is to provide a sputtered vapor laser that utilizes a hollow cathode secondary discharge and a primary laser discharge with electrical feedback means to control the current of the secondary discharge, thereby providing accurately controllable conditions of the laser medium.

SUMMARY OF THE INVENTION

Briefly, in accordance with the invention, a sputtered vapor laser is provided in which two discharges are utilized to accurately control the concentration of the vapor lasing medium required for laser oscillation. The laser comprises a carrier gas located within the laser tube, a hollow cathode structure whose surface is coated with the desired lasing medium, an anode that acts in conjunction with the hollow cathode to provide a secondary discharge therebetween, and a primary cathode that acts in conjunction with the hollow cathode to provide the primary laser discharge. The action of the secondary discharge causes the positive ions of the carrier gas to bombard the coated surface of the hollow cathode which causes the sputtering of vapor of the lasing medium within the hollow cathode. The primary cathode, which is biased more negatively than the hollow cathode, acts to draw the sputtered vapor out of the hollow cathode into the main plasma section of the laser and initiates the excitation of the atoms of the sputtered vapor by causing inelastic collisions with the carrier gas and with the electrons energized by the primary laser discharge. The two discharges may be controlled by a single high-voltage power supply and may also be provided with electrical feedback means to control the current of the secondary discharge. The action of the primary cathode in drawing out the sputtered vapor from the hollow cathode into the main plasma section of the laser prevents the high concentration of electrons with the hollow cathode from adversely affecting the population inversion mechanisms necessary for laser oscillations.

BRIEF DESCRIPTION OF THE DRAWING

The specific nature of the invention as well as other objects, aspects, uses, and advantages thereof will clearly appear from the following description and from the accompanying drawing, in which:

The FIGURE illustrates in a schematic cutaway side view a preferred embodiment of the sputtered vapor laser of the present invention.

DESCRIPTION OF THE PREFERRED EMBODIMENT

The FIGURE illustrates a preferred embodiment of the sputtered vapor laser 10 of the present invention. Laser 10 is seen to be comprised primarily of a main plasma section 12 located between a secondary discharge section 14 and a primary discharge section 8. The walls of the device may be constructed of glass or of any other suitable material. Within secondary discharge section 14 is located a hollow cathode structure 24 that is lined with the desired lasing medium 28. Power is provided to hollow cathode 24 by means of an external electrode 22. Also located within secondary discharge section 14 is anode 20 that is biased more positively than hollow cathode 24. A carrier gas such as helium, neon or argon, for example, is placed in the region 36 of secondary discharge section 14. A pair of openings 6 and 26 are provided in either end of hollow cathode 24, opening 6 placing region 32 within hollow cathode 24 in communication with the region 34 of main plasma section 12 of the laser. A primary cathode 30 is biased more negatively than hollow cathode 24 and is located within primary discharge section 8 of laser 10. The three sections 8, 12, and 14 are placed inside an optical resonator consisting of two optically facing dielectrically coated reflectors 18 and 38 having a high reflectivity at the desired operating wavelength. The axially propagated radiation at this wavelength is directed, via windows 16 inclined at Brewster's angle for maximum transmission, to reflectors 18 and 38 which reflect the radiation back and forth a sufficient number of times to sustain laser oscillation. Some degree of transmission is provided at the operating wavelength through at least one reflector 38 to provide an output beam. Alternatively, the Brewster's windows 16 can be replaced by internal mirrors to form the optical resonator of the laser.

In operation, secondary anode 20 acts in conjunction with hollow cathode 24 to provide a secondary discharge therebetween. This secondary discharge causes the positive ions of the carrier gas located in region 36 to bombard coated surface 28 of hollow cathode 24. This bombardment causes the sputtering of vapor of the lasing medium of which coated surface 28 is constructed. This sputtered vapor is created and collected within region 32 of hollow cathode 24. The application of a more negative potential to primary cathode 30 than is present upon hollow cathode 24 acts to draw out the sputtered vapor from region 32 through opening 6 into region 34 of main plasma section 12. The sputtered vapor drifts towards primary cathode 30 along main plasma section 12 to provide the required concentration of atoms in which to sustain laser oscillation. Additionally, the atoms of the sputtered vapor are excited in region 34 of main plasma section 12 by inelastic collisions with excited carrier gas atoms or ions or with electrons energized by the electric field existing in the discharge between hollow cathode 24 and primary cathode 30. The self-heating effect of the primary laser discharge in main plasma section 12 is such as to prevent condensation of the vapor of the lasing material before it has been excited in the primary laser discharge. Finally, the sputtered vapor condenses on the cold parts of laser 10 that lie just beyond main plasma section 12. The continuous sputtering action within hollow cathode 24 provides a high concentration of electrons in region 32. The action of primary cathode 30 in drawing out the sputtered vapor from region 32 into region 34 of main plasma section 12 prevents this high concentration of electrons from adversely affecting the laser population inversion mechanisms. That is, there is a distinct advantage in not having the lasing action take place in hollow cathode 24: lasing conditions can operate and be controlled virtually independent of the sputtering conditions.

It is seen that I have provided a device which solves the problem involved in providing a sufficient density of gas vapor required for a lasing medium. In the device of the present invention the electrical sputtering action quickly provides the necessary vapor. This device enables different metals of high melting points and other elements and nonmetallic compounds to be used as laser media by using them to form the hollow cathode or as liner materials inside a hollow cathode which is made of a suitable electrically conducting cathode material such as molded carbon or stainless steel. Suggested materials which may be used as laser media are elements of cadmium, zinc, strontium, lead, germanium, arsenic, antimony, selenium, and compounds such as metallic sulfides. This list is by no means exhaustive of laser materials which could be vaporized in the device of the present invention, since any such material could be utilized that sputters readily. The invention enables a vapor laser to be operated without an externally heated reservoir and without the requirement for a local high-temperature environment, providing for no warmup time. A single high-voltage power supply with suitable voltage taps can be used to run both discharges. By utilizing a discharge instead of a heated reservoir to give the necessary vapor pressure in the laser, and by utilizing electrical feedback to the secondary discharge, it is possible to accurately control the conditions of the laser medium. The invention will extend laser operation into elements or materials which do not have a high vapor pressure at reasonable working temperatures.

I wish it to be understood that I do not desire to be limited to the exact details of construction shown and described for obvious modifications will occur to a person skilled in the art.

I claim as my invention

1. A sputtered vapor laser, comprising:
    a. a carrier gas;
    b. a hollow cathode whose surface comprises a source of a lasing material;
    c. an anode located in close proximity to said hollow cathode for producing a secondary discharge therebetween to evolve said lasing material;
    d. a main plasma section located adjacent to end communicating with said hollow cathode; and
    e. a primary cathode remote from end hollow cathode for providing the desired concentration of vaporized lasing material within said main plasma section of said laser and for producing a primary laser discharge therefrom.

2. The invention according the claim 1 wherein said secondary discharge causes the positive ions of said carrier gas to bombard said surface of said hollow cathode thereby causing the sputtering of vapor from said lasing material within said hollow cathode.

3. The invention according to claim 2 wherein said primary cathode is biased more negatively than said hollow cathode and acts to draw said sputtered vapor out of said hollow cathode into said main plasma section and to excite the atoms of said sputtered vapor by causing inelastic collisions with said carrier gas and with the electrons energized by said primary laser discharge whereby laser oscillation of the excited vapor is initiated.

4. The invention according to claim 3 wherein said hollow cathode is provided with openings in both ends, one of which is in communication with said main plasma section of said laser.

5. The invention according to claim 4 wherein said primary laser discharge provides a self-heating effect in said main plasma section to prevent condensation of said vapor prior to its excitation by said primary laser discharge.

6. The invention according to claim 5 further comprising a high-voltage power supply to operate both said primary laser discharge and said secondary discharge.

7. The invention according to claim 6 including electrical feedback means to control the current of said secondary discharge.

8. The invention according to claim 7 wherein said carrier gas is selected from the group consisting of noble gages and molecular gases.

9. The invention according to claim 8 wherein said lasing material is selected from the group consisting of cadmium, zinc, strontium, lead, germanium, arsenic, antimony, selenium and metallic sulfides.

* * * * *

UNITED STATES PATENT OFFICE
CERTIFICATE OF CORRECTION

Patent No. 3,621,460　　　　　　　　　　Dated November 16, 1971

Inventor(s) Colin S. Willett

It is certified that error appears in the above-identified patent and that said Letters Patent are hereby corrected as shown below:

In claim 1, column 4, line 10, change "end" to --and--.

In claim 1, column 4, line 12, change "end" to --said--.

In claim 8, column 4, line 44, change "gages" to --gases--.

Signed and sealed this 10th day of October 1972.

(SEAL)
Attest:

EDWARD M. FLETCHER, JR.　　　　　　ROBERT GOTTSCHALK
Attesting Officer　　　　　　　　　　Commissioner of Patents